US011996135B2

(12) United States Patent
Ayyapureddi et al.

(10) Patent No.: US 11,996,135 B2
(45) Date of Patent: May 28, 2024

(54) MEMORY DEVICES AND SYSTEMS CONFIGURED TO COMMUNICATE A DELAY SIGNAL AND METHODS FOR OPERATING THE SAME

(71) Applicant: Micron Technology, Inc., Boise, ID (US)

(72) Inventors: Sujeet Ayyapureddi, Boise, ID (US); Randall J. Rooney, Boise, ID (US)

(73) Assignee: Micron Technology, Inc., Boise, ID (US)

( * ) Notice: Subject to any disclaimer, the term of this patent is extended or adjusted under 35 U.S.C. 154(b) by 234 days.

(21) Appl. No.: 17/543,932

(22) Filed: Dec. 7, 2021

(65) Prior Publication Data
US 2022/0223195 A1 Jul. 14, 2022

Related U.S. Application Data

(60) Provisional application No. 63/137,347, filed on Jan. 14, 2021.

(51) Int. Cl.
*G06F 13/16* (2006.01)
*G06F 21/55* (2013.01)
*G11C 11/4078* (2006.01)

(52) U.S. Cl.
CPC ...... *G11C 11/4078* (2013.01); *G06F 13/1605* (2013.01); *G06F 13/1668* (2013.01); *G06F 21/554* (2013.01); *G06F 2221/034* (2013.01)

(58) Field of Classification Search
None
See application file for complete search history.

(56) References Cited

U.S. PATENT DOCUMENTS

| | | |
|---|---|---|
| 2004/0236970 A1 | 11/2004 | Johnson |
| 2009/0010080 A1 | 1/2009 | Fujioka et al. |
| 2020/0089560 A1 | 3/2020 | Lee et al. |
| 2020/0201418 A1 | 6/2020 | Richter et al. |
| 2020/0401476 A1 | 12/2020 | Cha et al. |
| 2021/0241822 A1* | 8/2021 | Vogelsang ........ G11C 11/40615 |

OTHER PUBLICATIONS

International Application No. PCT/US2021/061460—PCT International Search Report and Written Opinion, dated Apr. 1, 2022, 10 pages.

* cited by examiner

*Primary Examiner* — Scott C Sun
(74) *Attorney, Agent, or Firm* — Perkins Coie LLP

(57) ABSTRACT

Memory devices, systems including memory devices, and methods of operating memory devices are described in which waterfall attacks can be prevented from degrading data by alerting a memory controller that the memory device requests time to perform internal management operations, and should not be sent any further commands (e.g., activate commands) for a predetermined amount of time. In one embodiment, a memory device includes an external pin, a mode register, a memory array including a plurality of rows of memory cells, and circuitry configured to: determine that a criterion to perform an internal management operation on a subset of the plurality of rows has been met, transmit, in response to determining the criterion has been met, a signal to the external pin, determine a duration corresponding to the internal management operation, and write a bit value indicative of the determined duration to the mode register.

21 Claims, 4 Drawing Sheets

US 11,996,135 B2

MEMORY DEVICES AND SYSTEMS CONFIGURED TO COMMUNICATE A DELAY SIGNAL AND METHODS FOR OPERATING THE SAME

CROSS-REFERENCE TO RELATED APPLICATION(S)

The present application claims priority to U.S. Provisional Patent Application No. 63/137,347, filed Jan. 14, 2021, the disclosure of which is incorporated herein by reference in its entirety.

TECHNICAL FIELD

The present disclosure generally relates to memory devices, and more particularly relates to memory devices and systems configured to communicate a delay signal and methods for operating the same.

BACKGROUND

Memory devices are widely used to store information related to various electronic devices such as computers, wireless communication devices, cameras, digital displays, and the like. Information is stored by programing different states of a memory cell. Various types of memory devices exist, including magnetic hard disks, random access memory (RAM), read only memory (ROM), static RAM (SRAM), dynamic RAM (DRAM), synchronous dynamic RAM (SDRAM), and others. Memory devices may be volatile or non-volatile. Improving memory devices, generally, may include increasing memory cell density, increasing read/write speeds or otherwise reducing operational latency, increasing reliability, increasing data retention, reducing power consumption, or reducing manufacturing costs, among other metrics.

DETAILED DESCRIPTION

Figure 1:
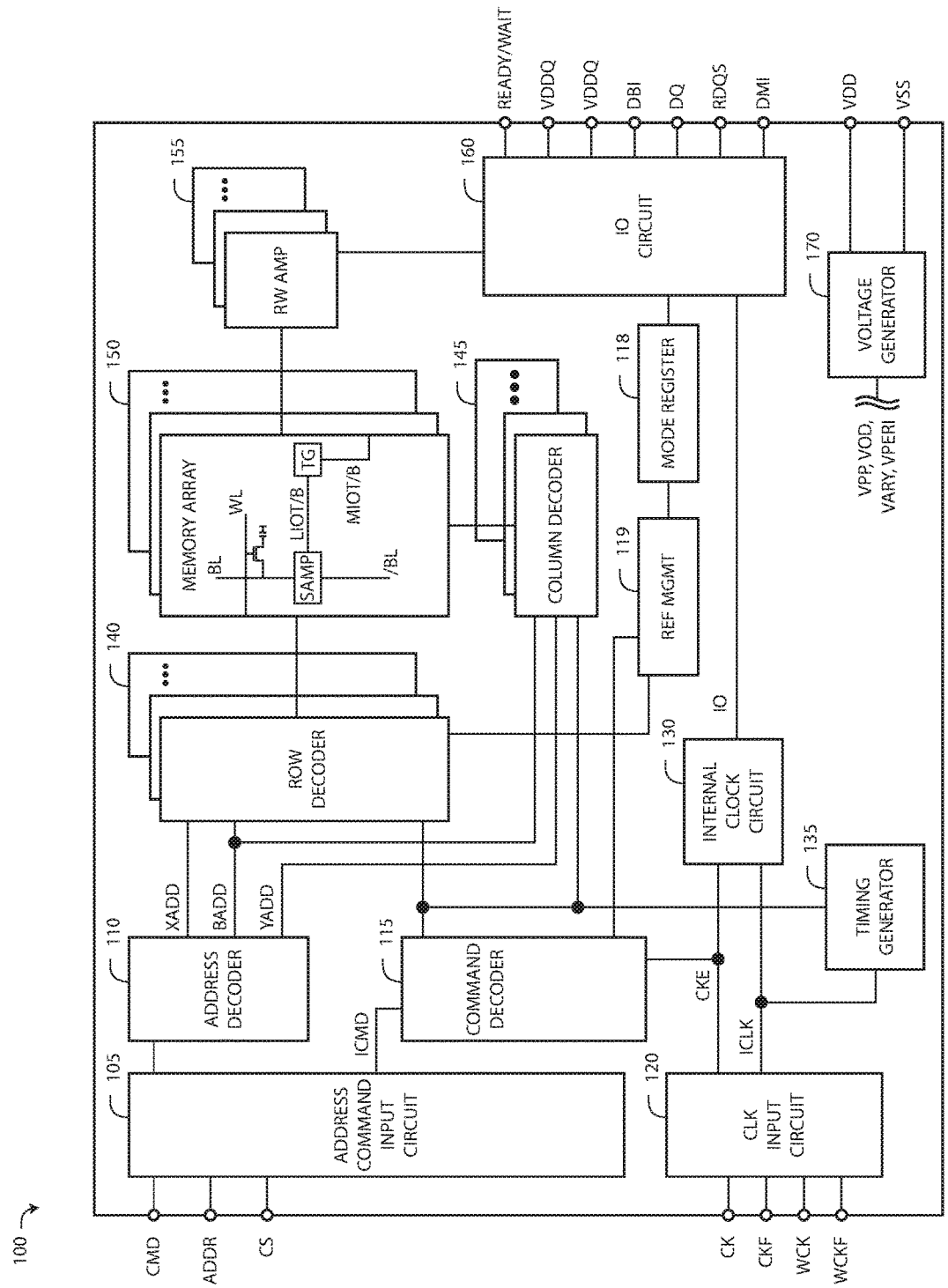
FIG. 1 is a simplified block diagram schematically illustrating a memory device in accordance with an embodiment of the present technology.

High data reliability, high speed of memory access, and reduced chip size are features that are demanded from semiconductor memory. Some semiconductor memory devices, such as DRAM, store information as charge accumulated in cell capacitors that can be prone to leakage, and which therefore require periodic refresh operations to prevent the information from being lost. In addition to charge leakage, the information may be lost or degraded by bit errors caused by disturb mechanisms such as row hammer. Row hammer affects memory cells coupled to a non-selected word line adjacent to a selected word line that is repeatedly driven to an active level in a short time. The activity on the adjacent word line can cause the charge in the cells of the non-selected word line to vary, putting the information stored therein at risk, unless a refresh operation is executed to refresh the charge in the memory cells.

In some memory devices, auto-refresh (AREF) commands indicating refresh operations are periodically issued from a control device such as a host or a controller operably coupled to the memory device. The AREF commands are provided from the control device at a frequency that all the word lines are certainly refreshed once in the one refresh cycle. As the refresh addresses according to the AREF commands are determined by a refresh counter provided in DRAM, refresh operations responsive to the AREF commands may not prevent bit errors due to row hammer effects.

One approach to addressing row hammer effects involves providing a memory device with circuitry to redirect or steal a portion of the available refresh opportunities (e.g., the regularly scheduled refresh commands received from a host device) to specific rows where hammer activity has been detected (e.g., adjacent to a row where a large number of activation commands have been executed). With the continual reduction in size of memory arrays, and the corresponding increase in sensitivity to row hammer effects, the threshold number of adjacent-row activate commands that can be allowed to occur before a row is refreshed continues to decrease. This situation can permit a hostile actor to exploit row hammer effects to intentionally overwhelm a memory device with targeted row hammer activity in order to degrade the data in a memory array.

In one such attack, generally referred to as a "waterfall" attack, multiple victim rows in an array are targeted by row hammer activity (e.g., by activate commands directed to one or more rows adjacent to the victim rows) to bring the count of adjacent-row activate commands close to, but still below, the threshold number that would trigger a targeted refresh of the victim rows. Once a sufficiently large number of such victim rows have been so primed, the attack involves pushing a large number of victim rows past the threshold number in short order. The memory device so attacked will respond by adding all of the victim rows to a queue for refresh operations, but in the time it takes the entire queue to be refreshed, additional activate commands continue to hammer the same set of victim rows, such that some of the rows experience such significant row hammer disturbance effects, that their contents can be degraded (e.g., bit flips in the data can occur) before they have been refreshed (e.g., due to their position in the refresh queue).

Accordingly, several embodiments of the present technology are directed to memory devices, systems including memory devices, and methods of operating memory devices in which waterfall attacks can be prevented from degrading data by alerting a memory controller that the memory device requests time to perform internal management operations, and should not be sent any further commands (e.g., activate commands) for a predetermined amount of time. In one embodiment, in response to detecting a waterfall attack (e.g., in response to row exceeding a first threshold number of adjacent-row activations), the memory device can assert a signal at an external pin (e.g., a dedicated READY/WAIT pin, or a multi-purpose I/O pin) to alert a connected controller to perform a mode register read operation directed to a mode register in which the memory device has stored (e.g., written) an indication of the amount of time the memory device will spend in internal management operations (e.g., performing targeted refresh operations on identified victim rows) and during which it should not be targeted by further commands. The amount of time can be calculated by, e.g., determining a number of victim rows above a second threshold amount of adjacent-row activations, and calculating an amount of time required to refresh that number of victim rows.

FIG. 1 is a block diagram schematically illustrating a memory device 100 (e.g., a DRAM) in accordance with an embodiment of the present technology. The memory device 100 may include an array of memory cells, such as memory array 150. The memory array 150 may include a plurality of banks (e.g., banks 0-15 in the example of FIG. 1), and each bank may include a plurality of word lines (WL), a plurality of bit lines (BL), and a plurality of memory cells arranged at intersections of the word lines and the bit lines. The selection of a word line WL may be performed by a row decoder 140, and the selection of a bit line BL may be performed by a column decoder 145. Sense amplifiers (SAMP) may be provided for corresponding bit lines BL and connected to at least one respective local I/O line pair (LIOT/B), which may in turn be coupled to at least respective one main I/O line pair (MIOT/B), via transfer gates (TG), which can function as switches.

The memory device 100 may employ a plurality of external terminals that include command and address terminals coupled to a command bus and an address bus to receive command signals CMD and address signals ADDR, respectively. The memory device may further include a chip select terminal to receive a chip select signal CS, clock terminals to receive clock signals CK and CKF, data clock terminals to receive data clock signals WCK and WCKF, data terminals DQ, RDQS, DBI, and DMI, power supply terminals VDD, VSS, VDDQ, and VSSQ, and on-die termination terminal(s) ODT.

The command terminals and address terminals may be supplied with an address signal and a bank address signal from outside. The address signal and the bank address signal supplied to the address terminals can be transferred, via a command/address input circuit 105, to an address decoder 110. The address decoder 110 can receive the address signals and supply a decoded row address signal (XADD) to the row decoder 140, and a decoded column address signal (YADD) to the column decoder 145. The address decoder 110 can also receive the bank address signal (BADD) and supply the bank address signal to both the row decoder 140 and the column decoder 145.

The command and address terminals may be supplied with command signals CMD, address signals ADDR, and chip selection signals CS, from a memory controller. The command signals may represent various memory commands from the memory controller (e.g., including access commands, which can include read commands and write commands). The select signal CS may be used to select the memory device 100 to respond to commands and addresses provided to the command and address terminals. When an active CS signal is provided to the memory device 100, the commands and addresses can be decoded and memory operations can be performed. The command signals CMD may be provided as internal command signals ICMD to a command decoder 115 via the command/address input circuit 105. The command decoder 115 may include circuits to decode the internal command signals ICMD to generate various internal signals and commands for performing memory operations, for example, a row command signal to select a word line and a column command signal to select a bit line. The internal command signals can also include output and input activation commands, such as clocked command CMDCK.

When a read command is issued and a row address and a column address are timely supplied with the read command, read data can be read from memory cells in the memory array 150 designated by these row address and column address. The read command may be received by the command decoder 115, which can provide internal commands to input/output circuit 160 so that read data can be output from the data terminals DQ, RDQS, DBI, and DMI via read/write amplifiers 155 and the input/output circuit 160 according to the RDQS clock signals. The read data may be provided at a time defined by read latency information RL that can be programmed in the memory device 100, for example, in a mode register (not shown in FIG. 1). The read latency information RL can be defined in terms of clock cycles of the CK clock signal. For example, the read latency information RL can be a number of clock cycles of the CK signal after the read command is received by the memory device 100 when the associated read data is provided.

When a write command is issued and a row address and a column address are timely supplied with the command, write data can be supplied to the data terminals DQ, DBI, and DMI according to the WCK and WCKF clock signals. The write command may be received by the command decoder 115, which can provide internal commands to the input/output circuit 160 so that the write data can be received by data receivers in the input/output circuit 160, and supplied via the input/output circuit 160 and the read/write amplifiers 155 to the memory array 150. The write data may be written in the memory cell designated by the row address and the column address. The write data may be provided to the data terminals at a time that is defined by write latency WL information. The write latency WL information can be programmed in the memory device 100, for example, in the mode register (not shown in FIG. 1). The write latency WL information can be defined in terms of clock cycles of the CK clock signal. For example, the write latency information WL can be a number of clock cycles of the CK signal after the write command is received by the memory device 100 when the associated write data is received.

The power supply terminals may be supplied with power supply potentials VDD and VSS. These power supply potentials VDD and VSS can be supplied to an internal voltage generator circuit 170. The internal voltage generator circuit 170 can generate various internal potentials VPP, VOD, VARY, VPERI, and the like based on the power supply potentials VDD and VSS. The internal potential VPP can be used in the row decoder 140, the internal potentials VOD and VARY can be used in the sense amplifiers included in the memory array 150, and the internal potential VPERI can be used in many other circuit blocks.

The power supply terminal may also be supplied with power supply potential VDDQ. The power supply potential VDDQ can be supplied to the input/output circuit 160 together with the power supply potential VSS. The power supply potential VDDQ can be the same potential as the power supply potential VDD in an embodiment of the present technology. The power supply potential VDDQ can be a different potential from the power supply potential VDD in another embodiment of the present technology. However, the dedicated power supply potential VDDQ can be used for the input/output circuit 160 so that power supply noise generated by the input/output circuit 160 does not propagate to the other circuit blocks.

The on-die termination terminal(s) may be supplied with an on-die termination signal ODT. The on-die termination signal ODT can be supplied to the input/output circuit 160 to instruct the memory device 100 to enter an on-die termination mode (e.g., to provide one of a predetermined number of impedance levels at one or more of the other terminals of the memory device 100).

The clock terminals and data clock terminals may be supplied with external clock signals and complementary external clock signals. The external clock signals CK, CKF, WCK, WCKF can be supplied to a clock input circuit 120. The CK and CKF signals can be complementary, and the WCK and WCKF signals can also be complementary. Complementary clock signals can have opposite clock levels and transition between the opposite clock levels at the same time. For example, when a clock signal is at a low clock level a complementary clock signal is at a high level, and when the clock signal is at a high clock level the complementary clock signal is at a low clock level. Moreover, when the clock signal transitions from the low clock level to the high clock level the complementary clock signal transitions from the high clock level to the low clock level, and when the clock signal transitions from the high clock level to the low clock level the complementary clock signal transitions from the low clock level to the high clock level.

Input buffers included in the clock input circuit 120 can receive the external clock signals. For example, when enabled by a CKE signal from the command decoder 115, an input buffer can receive the CK and CKF signals and the WCK and WCKF signals. The clock input circuit 120 can receive the external clock signals to generate internal clock signals ICLK. The internal clock signals ICLK can be supplied to an internal clock circuit 130. The internal clock circuit 130 can provide various phase and frequency controlled internal clock signal based on the received internal clock signals ICLK and a clock enable signal CKE from the command/address input circuit 105. For example, the internal clock circuit 130 can include a clock path (not shown in FIG. 1) that receives the internal clock signal ICLK and provides various clock signals to the command decoder 115. The internal clock circuit 130 can further provide input/output (IO) clock signals. The IO clock signals can be supplied to the input/output circuit 160 and can be used as a timing signal for determining an output timing of read data and the input timing of write data. The IO clock signals can be provided at multiple clock frequencies so that data can be output from and input to the memory device 100 at different data rates. A higher clock frequency may be desirable when high memory speed is desired. A lower clock frequency may be desirable when lower power consumption is desired. The internal clock signals ICLK can also be supplied to a timing generator 135 and thus various internal clock signals can be generated.

The memory device 100 may further include one or more registers 118 for storing various data (e.g., device status information). Mode registers 118 may include read-only bits, read-write bits, write-only bits, or any combination thereof. In some embodiments, mode registers 118 may be arranged in byte-sized addressable portions, with each individually-addressable mode register containing 8 bits. The mode register bits may be written in response to mode register write (MRW) commands in which the data to be written is provided over the CA interface, and the mode register bits may be read from in response to mode register read (MRR) commands in which the stored data output through the DQ data terminals. The mode registers 118 may also be read and written internally by various components of the memory device 100 (e.g., populating read-only mode register bits with device status or configuration information, determining a status of a write-only mode register bit, etc.), but without exchanging data with a terminal of the memory device.

The memory device 100 may further include a dedicated external terminal READY/WAIT for signaling to a connected controller that the memory device 100 requires time to perform internal management operations (e.g., refresh operations to mitigate row hammer disturb effects). In some embodiments, a shared I/O pin may be used instead of, or in addition to, a dedicated READY/WAIT pin to signaling to a connected controller. The determination may be made by a refresh management circuit 119 that maintains a count of activation commands received by each row in the array 150 since the last refresh operation at that row, and/or a count of activations targeting, for each row in the array 150, neighboring rows. Based on the determination by the refresh management circuit 119 that a waterfall attack is occurring, the refresh management circuit can assert the signal to trigger a connected controller to perform a read of a predetermined location in a mode register 118 in which the refresh management circuit 119 can write a delay amount corresponding to an amount of time the refresh management circuit 119 will spend performing maintenance operations (e.g., mitigating row hammer effects) and during which delay the controller should not send additional activate commands to the memory device 100, as set forth in greater detail below.

Memory devices such as the memory device 100 of FIG. 1 can be configured to execute refresh operations on portions of the memory array 150 in response to commands received from a connected host device or memory controller. The memory device 100 can track the addresses of the memory array 150 at which refresh operations are executed (e.g., in an address pointer), and can further track the number of refresh operations executed at the most recent address (e.g. in a bank counter). This arrangement can ensure that each bank 0-15 of the memory array 150 experiences at least one refresh operation (e.g., by counting sixteen operations) at a given address before the address pointer is incremented and the cycle is repeated.

As previously set forth, some of the refresh operations can be performed on rows determined to be victim rows of a row hammer disturb effect (e.g., in response to determining that a number of activation commands directed to one or more rows adjacent to the victim row have exceeded a predetermined threshold since the last refresh operation was performed on the victim row). Such targeted refresh operations may be routinely conducted without requiring a delay in new activate commands received from the controller, unless the memory device 100 is the target of a row hammer waterfall attack. The memory device 100 can be configured to determine when it is the target of such an attack by determining that a victim row has been subject to a very high number of disturb effects caused by adjacent-row activate commands since the last refresh operation at the victim row (e.g., a threshold number of such commands which is higher than the predetermined threshold used to target the row for a routine row hammer mitigation refresh operation). In response to such a determination, the memory device 100 can signal to a connected controller that it will spend a predetermined amount time in mitigating row hammer disturb effects, during which time it (or at least a subset of the array upon which the mitigation will be performed) should not be the recipient of additional activate commands.

Figure 2:
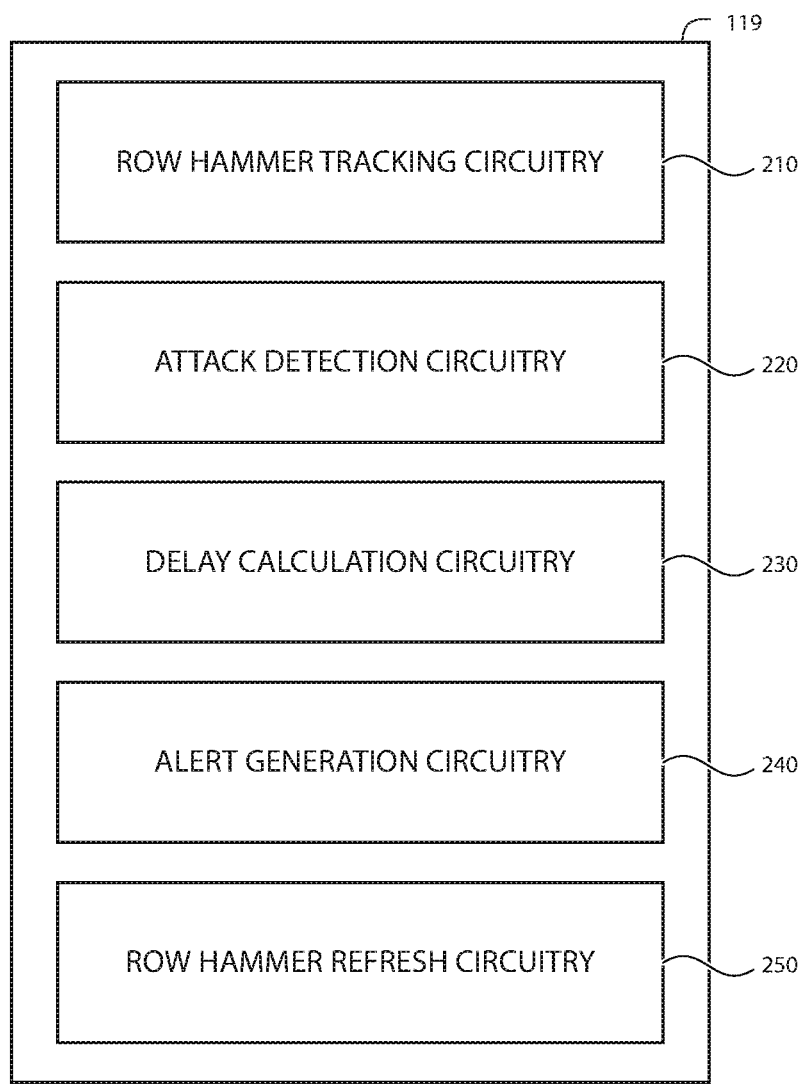
FIG. 2 is a simplified block diagram schematically illustrating a refresh management circuit in accordance with an embodiment of the present technology.

This may be more easily understood with reference to FIG. 2, which is a simplified block diagram schematically illustrating a refresh management circuit in accordance with an embodiment of the present technology. Refresh management circuit 119 can include row hammer tracking circuitry 210, which can be configured to maintain a count, for each row of memory in a memory device, of activation commands targeting that row since its last refresh operation (e.g., from which can be determined the amount of row hammer disturb effects imparted to adjacent rows). Alternatively, or in addition, the row hammer tracking circuitry 210 can be configured to maintain a count, for each row of memory in the memory device, of activation commands directed to neighboring rows (e.g., immediately adjacent rows and/or rows within a predetermined physical distance from the tracked row) since the last time the tracked row was refreshed. Maintaining this count (e.g., and monitoring and/or sorting the counts) permits the refresh management circuit 119 to identify when a row should be refreshed (e.g., when the count for the row exceeds a first predetermined threshold number) during the routine operation of the memory device (e.g., without asserting a WAIT signal to a coupled controller), and can further permit the refresh management circuitry 119 to determine when a waterfall attack or other event should trigger non-routine mitigation procedures.

In this regard, refresh management circuitry 119 can further include attack detection circuitry 220, which can monitor the counts maintained by row hammer tracking circuitry 210, and determine if an attack criteria has been met. For example, in one embodiment of the present technology, the attack detection circuitry 220 may monitor the counts maintained by the row hammer tracking circuitry 210 to determine if the count of any one row exceeds a second predetermined threshold number higher than the threshold used to trigger routine row hammer refresh operations. In this regard, if a row of memory in the device would be unacceptably likely to experience one or more bit flips if 100,000 activations targeting neighboring rows accrued before the row was refreshed, a first predetermined threshold for targeting the row with routine row hammer refresh mitigation (e.g., not involving a WAIT signal directed to a connected controller) might be 50,000 such activations. A second, higher threshold that would trigger the attack detection circuitry 220 might be 70,000 such activations.

Alternatively, rather than determining whether the count for a single row has reached a threshold number to determine if an attack is occurring, another approach involves attack detection circuitry 220 determining whether a predetermined number of rows have counts that exceed a second threshold number. In this regard, as the nature of a waterfall attack involves initially bringing a large number of rows to an elevated count, without triggering routine row hammer refresh operations, and subsequently bringing that large number of rows over the threshold for routine row hammer refresh operations, an attack detection approach that monitors for more than x rows with a count over a threshold number y can also be used. As will be readily appreciated by one of skill in the art, the values chosen for x and y may be specific to the design of a memory device (e.g., dependent upon the delay between refresh operations (tREFI), the sensitivity of the memory cells to disturb operations, etc.). In this regard, x may be as low as one, or may be as high as several hundred or even several thousand. Similarly, the threshold value y to determine whether the x rows should trigger the attack detection circuitry 220 can be higher than, lower than, or even the same as than the first predetermined threshold (e.g., used to trigger routine row hammer refresh operations).

In accordance with one aspect of the present disclosure, the foregoing threshold numbers (e.g., the first threshold used to trigger routine row hammer refresh operations, the second threshold number used to identify one or more counts that reflect an attack in progress, and even the number of rows that must exceed the second threshold) can be configurable and subject to change during operation of the memory device. For example, these values can be maintained in a mode register, and modified by overwriting the values in the mode register with different values, depending upon the desired sensitivity to attack and/or various operating requirements of the memory device.

Moreover, the foregoing threshold numbers are merely examples used for illustration of the disclosed technique, and may be higher or lower, and may be in vastly different ratios than the examples used above.

Once the attack detection circuitry 220 has determined, by whichever method selected, that an attack is occurring, it can trigger both an alert to be communicated to a connected controller (e.g., generated by alert generation circuitry 240) and a calculation (e.g., performed by delay calculation circuitry 230) of a delay during which the memory device will perform mitigation operations (e.g., refreshing some or all of the identified victim rows) and during which time a connected controller device should refrain from sending additional commands (e.g., activation commands) to the memory device.

In this regard, delay calculation circuitry 230 can be configured to calculate the desired delay in accordance with one of a variety of different approaches. In one embodiment, delay calculation circuitry 230 can identify, from the count maintained by row hammer tracking circuitry 210, a number of rows for which a mitigation operation (e.g., a row hammer refresh operation) should be performed, and based upon a predetermined duration that each such mitigation operation lasts, calculate a total delay (e.g., multiplying the number of identified rows by the predetermined duration) to be communicated to the connected controller. In determining the number of rows for which a mitigation operation should be performed, the delay calculation circuitry 230 can use a threshold which may be the same as the first threshold (e.g., used to trigger routine row hammer refresh operations), the same as the second threshold (e.g., when x rows over the second threshold are used to determine whether an attack is occurring), or a different third threshold, whether higher or lower than the first and/or second threshold (e.g., from 50%-80% of the second threshold), which can likewise be user-configurable (e.g., written to a mode register and subject to overwriting depending upon the needs of the user or the operating environment).

In accordance with another aspect of the subject technology, the number of rows for which a mitigation operation should be performed may be determined without reference to an absolute threshold value, but may rather involve taking an upper portion of a sorted list of counts maintained by the row hammer tracking circuitry 210 (e.g., the top z % of the list, such as the top 5%, the top 10%, the top 15%, etc.).

The delay calculation circuitry 230 may determine the delay, in one embodiment, by multiplying the number of rows so determined for which a mitigation operation is to be performed by a duration of the mitigation operation (e.g., if each row will be separately refreshed, and each row refresh takes a predetermined amount of time, the total delay may correspond to the product of the time to refresh a row and the number of rows to refresh). In some circumstances, however, the total delay may be calculated in other manners. For example, if some of the rows can be refreshed in parallel (e.g., rows in separate banks), the delay calculation circuitry 230 may instead determine the total delay by counting the number of rows to be refreshed in each bank, and multiplying the largest such number (e.g., corresponding to the bank with the most rows to be refreshed) by the time each refresh operation will take (e.g., the time to finish refreshing the bank with the most rows to be refreshed). In still other embodiments, the calculation of the total delay may include additional components, such as a delay associated with a mode register read command (e.g., the mode register read command triggered by an alert signal, described in greater detail below), a delay associated with pre-charging banks of the memory device (e.g., which may be done in advance of a mode register read command), and other factors readily apparent to those of skill in the art.

However calculated, the total delay can be stored by the refresh management circuit 119 (e.g., by the delay calculation circuitry 230) by writing a bit value indicative of the total delay to a mode register, such as mode register 118, in a predetermined location to which the connected controller will have been configured to direct a mode register read command upon receipt of an alert signal. In accordance with one aspect, the total delay may be stored as a number of clock cycles, or as a number of operations to occur (e.g., where the duration of each operation is previously known to the controller), or in any other manner suitable for specifying a period of time.

In parallel with the calculation of the total delay performed by the delay calculation circuitry 230 (or, in other embodiments before the calculation or after the calculation), the alert generation circuitry 240 of the refresh management circuit 119 can, in response to the determination by the attack detection circuitry 220 that an attack is occurring, generate an alert to a connected controller that the memory device will undergo internal management operations (e.g., row hammer refresh operations) for a predetermined amount of time, in order to trigger the connected host device to perform a mode register read operation of a mode register 118 in which the refresh management circuit 119 has written a bit value indicative of the calculated delay. The alert can, in one embodiment, take the form of an asserted voltage on a dedicated external pin of the memory device, such as a dedicated READY/WAIT pin, which can either be pulsed, or maintained until an acknowledgement is received (e.g., until the mode register read operation is commanded or takes place). In another embodiment, the alert may make use of a multi-purpose pin, rather than a dedicated pin, such as an existing ALERT signal line, or any one of a number of multi-function I/O pins described in greater detail above and/or known to those of skill in the art.

In accordance with one aspect of the present disclosure, the row hammer refresh circuitry 250 of the refresh management circuit 119 can be configured to delay implementation of the predetermined internal mitigation operation (e.g., the refresh operations directed to the rows determined by the delay calculation circuitry 230 based upon the counts maintained by the row hammer tracking circuitry 210) until after a connected controller has performed a mode register read operation on the location in which the calculated total delay is stored (e.g., as a bit value indicative of the calculated total delay). In another embodiment, the row hammer refresh circuitry 250 can begin mitigation operations as soon as an alert is generated, or even as soon as an attack is determined to be occurring.

In accordance with one embodiment of the present disclosure, a memory system in which memory devices employ the foregoing strategy for identifying and alerting a connected controller to the occurrence of a waterfall attack (or other activity which triggers the memory device to request a delay in operations) can include a controller configured to response to the alert in a predetermined way (e.g., by performing a mode register read operation to a predetermined location storing a delay and by refraining from targeting the memory device, or an identified subset thereof, with activate commands for the duration of the delay). Such an arrangement benefits both the memory device (e.g., which is able to mitigate the condition of the victim rows without additional activations that might cause sufficient disturb effects to cause data degradation or loss) and the controller (e.g., which is able to use the information about the requested delay to organize and/or schedule its operations accordingly).

Figure 3:
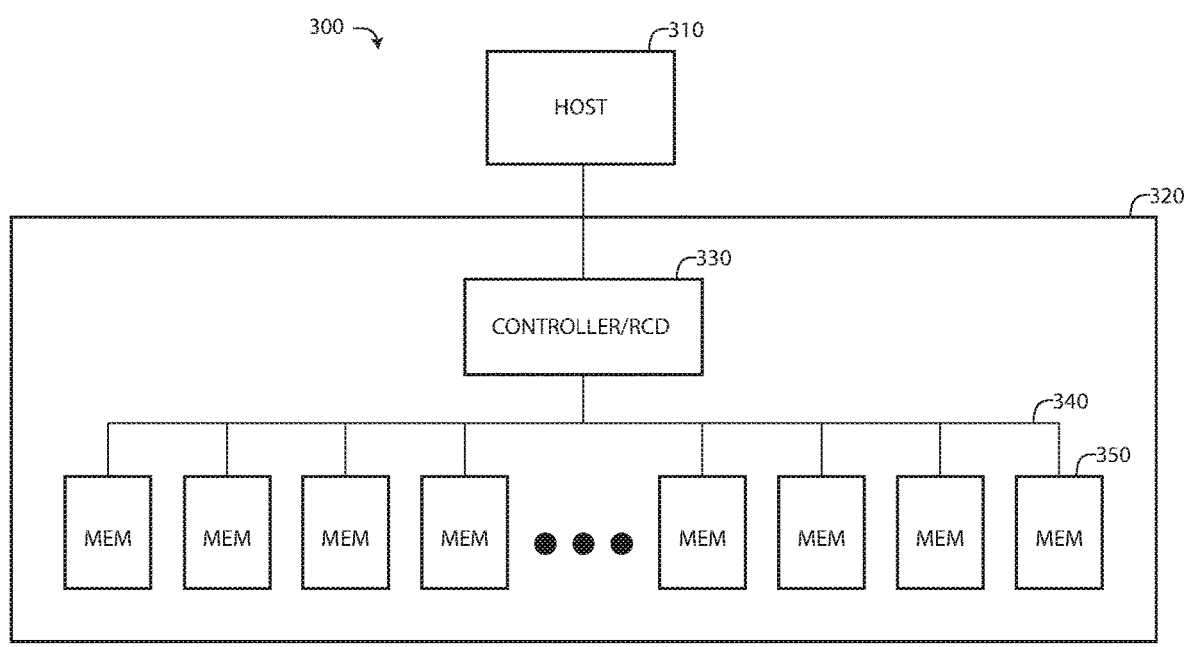
FIG. 3 is a simplified block diagram schematically illustrating a memory system in accordance with an embodiment of the present technology.

This may be more easily understood with reference to FIG. 3, which is a simplified block diagram schematically illustrating a memory system in accordance with an embodiment of the present technology. Memory system 300 includes a host device 310 operably coupled to a memory module 320 (e.g., a dual in-line memory module (DIMM)). Memory module 320 can include a controller or an RCD 330 operably connected by one or more control lines and/or buses (such as bus 340, which although schematically illustrated as a single parallel bus, may comprise a variety of separate clock trees, command/address buses, data buses, and signal, alert, and/or control lines, as set forth in greater detail above) to a plurality of memory devices 350. In accordance with one aspect of the present disclosure, when a memory device 350 determines that internal management operations necessitating a pause in commands from the controller 330 should be performed, it can alert the controller 330 (e.g., with an alert on a dedicated external pin, or using a multi-purpose I/O pin) of the requested delay, and the controller 330 can respond to the alert by reading the requested delay from a location in the memory device (e.g., from a mode register, or from another storage location in the memory device, including in some cases the main memory array). The controller 330 can thereafter refrain from sending additional commands (e.g., activate commands) to the memory device 350 requesting the delay until the delay has elapsed, providing sufficient time for the memory device 350 to perform the internal management operations (e.g., row hammer refresh operations).

Although in the foregoing example embodiments, memory devices have been illustrated and described as requesting a delay from any commands directed thereto for the duration of a calculated delay associated with internal management operations, in other embodiments the foregoing technique can be implemented on a more granular basis than at a memory device level. For example, the foregoing approach can be implemented at a level corresponding to a subset of the memory device (e.g., at a bank level, at a group-of-rows level, etc.), or alternatively at a level corresponding to a set of memory devices (e.g., at a rank level, etc.). In this regard, refresh management circuitry can be configured to calculate and communicate not only a delay amount to be read by a connected controller, but can also be configured to communicate to the controller a region of the memory device, or a range of addresses, corresponding to the delay (e.g., a delay corresponding to 30 refreshes to be performed in bank one, such that the controller is requested to refrain from targeting bank one for the duration of the calculated delay). In this regard, the communication of the region or addresses to be exempted from commands for a delay can similarly be written to a predetermined location of a mode register or written to another storage location of the memory device, for reading by a controller in response to an alert signal.

Although in the foregoing example embodiments, memory devices have been described and illustrated as utilizing a mode register to store a delay and to communicate the delay to a connected controller by transmitting an alert signal to trigger a mode register read command, in other embodiments of the present disclosure memory devices can employ other approaches to communicate the calculated delay to a connected controller. For example, rather than storing the value in a predetermined location of a mode register, other storage locations in the memory device could be used (e.g., latches, portions of the main memory array not exposed to an end user, etc.). Moreover, in yet another embodiment, rather than store a calculated total delay to be read by a connected controller in response to an alert signal, the calculated total delay can be used to determine how many alert signals, which are configured to each trigger a predetermined delay from the controller, should be sequentially sent to the controller (e.g., thereby achieving the desired total delay from additional activation commands). Those of skill in the art will appreciate that other well-known feedback mechanisms for communicating information from a memory device to a connected controller could similarly be employed to request a delay of a calculated amount from a connected controller in keeping with various other embodiments of the disclosed technology.

Although in the foregoing example embodiments, memory devices and systems have been illustrated and described as detecting a "waterfall" attack and calculating a delay based upon a number of rows vulnerable thereto, the foregoing disclosed approach of calculating and communicating a requested delay from further commands has application to any one of a number of other circumstances in which a memory device determines to perform internal management operations. For example, a memory device might calculate a delay during which to perform other internal management operations (e.g., refresh operations, imprint/polarization management, wear leveling, etc.) and similarly communicate that calculated delay to a controller by asserting (e.g., transmitting) an alert (e.g., on a dedicated READY/WAIT pin or a multi-purpose I/O pin) and storing the calculated delay in a predetermined controller-accessible location.

Figure 4:
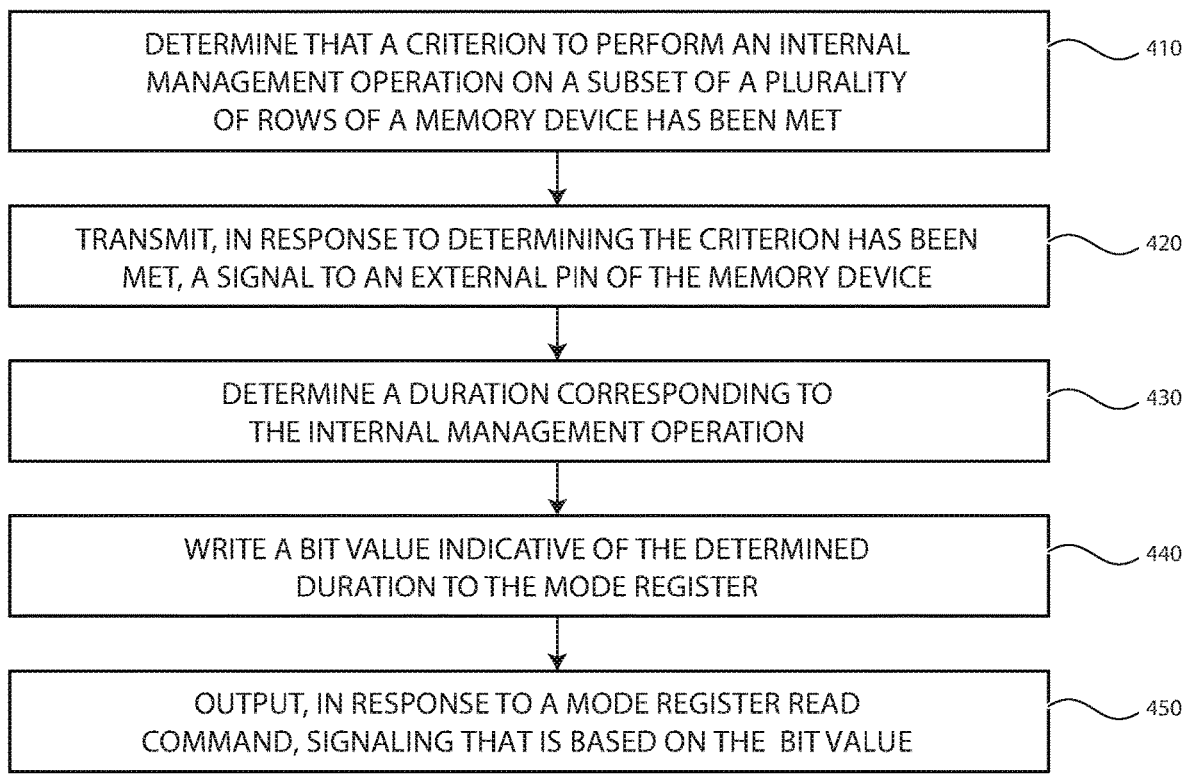
FIG. 4 is a flow chart illustrating a method of operating a memory device in accordance with an embodiment of the present technology.

FIG. 4 is a flow chart illustrating a method of operating a memory system in accordance with an embodiment of the present technology. The method includes determining that a criterion to perform an internal management operation on a subset of a plurality of rows of the memory device has been met (box 410). According to one aspect of the present disclosure, the determining features of box 410 may be implemented with attack detection circuitry 220 of refresh management circuitry 119 as illustrated in FIG. 2 in greater detail, above. The method further includes transmitting, in response to determining the criterion has been met, a signal to an external pin of the memory device (box 420). According to one aspect of the present disclosure, the transmitting features of box 420 may be implemented with alert generation circuitry 240 of refresh management circuitry 119 as illustrated in FIG. 2 in greater detail, above. The method further includes determining a duration corresponding to the internal management operation (box 430). According to one aspect of the present disclosure, the determining features of box 430 may be implemented with delay calculation circuitry 230 of refresh management circuitry 119 as illustrated in FIG. 2 in greater detail, above. The method further includes writing a bit value indicative of the determined duration to the mode register (box 440). According to one aspect of the present disclosure, the storing features of box 440 may be implemented with delay calculation circuitry 230 of refresh management circuitry 119 and mode register 118 as illustrated in FIGS. 1 and 2 in greater detail, above. The method further includes outputting, in response to a mode register read command, signaling that is based on the bit value indicative of the duration written to the mode register (box 450). According to one aspect of the present disclosure, the outputting features of box 450 may be implemented with mode register 118 and input/output circuit 160 as illustrated in FIGS. 1 and 2 in greater detail, above.

It should be noted that the methods described above describe possible implementations, and that the operations and the steps may be rearranged or otherwise modified and that other implementations are possible. Furthermore, embodiments from two or more of the methods may be combined.

Although in the foregoing example embodiments, memory modules and devices have been illustrated and described with respect to DRAM devices, embodiments of the present technology may have application to other memory technologies, including SRAM, SDRAM, NAND and/or NOR flash, phase change memory (PCM), magnetic RAM (MRAM), ferroelectric RAM (FeRAM), etc. Moreover, although memory modules have been illustrated and described as dual in-line memory modules (DIMMs) having nine memory devices, embodiments of the disclosure may include more or fewer memory devices, and/or involve other memory module or package formats (e.g., single in-line memory modules (SIMMs), small outline DIMMS (SODIMMs), single in-line pin packages (SIPPs), custom memory packages, etc.).

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof. Some drawings may illustrate signals as a single signal; however, it will be understood by a person of ordinary skill in the art that the signal may represent a bus of signals, where the bus may have a variety of bit widths.

The devices discussed herein, including a memory device, may be formed on a semiconductor substrate or die, such as silicon, germanium, silicon-germanium alloy, gallium arsenide, gallium nitride, etc. In some cases, the substrate is a semiconductor wafer. In other cases, the substrate may be a silicon-on-insulator (SOI) substrate, such as silicon-on-glass (SOG) or silicon-on-sapphire (SOP), or epitaxial layers of semiconductor materials on another substrate. The conductivity of the substrate, or sub-regions of the substrate, may be controlled through doping using various chemical species including, but not limited to, phosphorous, boron, or arsenic. Doping may be performed during the initial formation or growth of the substrate, by ion-implantation, or by any other doping means.

The functions described herein may be implemented in hardware, software executed by a processor, firmware, or any combination thereof. Other examples and implementations are within the scope of the disclosure and appended claims. Features implementing functions may also be physically located at various positions, including being distributed such that portions of functions are implemented at different physical locations.

As used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

From the foregoing, it will be appreciated that specific embodiments of the invention have been described herein for purposes of illustration, but that various modifications may be made without deviating from the scope of the invention. Rather, in the foregoing description, numerous specific details are discussed to provide a thorough and enabling description for embodiments of the present technology. One skilled in the relevant art, however, will recognize that the disclosure can be practiced without one or more of the specific details. In other instances, well-known structures or operations often associated with memory systems and devices are not shown, or are not described in detail, to avoid obscuring other aspects of the technology. In general, it should be understood that various other devices, systems, and methods in addition to those specific embodiments disclosed herein may be within the scope of the present technology.

What is claimed is:

1. A memory device, comprising:
   an external pin;
   a mode register;
   a memory array including a plurality of rows of memory cells; and
   circuitry configured to:
      determine that a criterion to perform an internal management operation on a subset of the plurality of rows has been met,
      in response to determining the criterion has been met, transmit a signal to the external pin,
      determine a duration corresponding to the internal management operation,
      write a bit value indicative of the determined duration to the mode register.

2. The memory device of claim 1, wherein the circuitry is further configured to output, in response to a mode register read command, signaling that is based on the bit value written to the mode register.

3. The memory device of claim 1, wherein the criterion includes a first row of the subset accumulating a count of activations exceeding a first threshold.

4. The memory device of claim 3, wherein determining the duration includes determining a number of rows in the subset.

5. The memory device of claim 1, wherein determining the number of rows in the subset includes determining that the rows in the subset have each accumulated a count of activations exceeding a second threshold lower than the first threshold.

6. The memory device of claim 3, wherein count of activations comprise activations directed to rows adjacent to the first row.

7. The memory device of claim 1, wherein the internal management operation includes refreshing the rows of the subset.

8. The memory device of claim 1, wherein the external pin is a dedicated READY/WAIT pin.

9. The memory device of claim 1, wherein transmitting the signal to the external pin includes maintaining a predetermined voltage at the external pin until a command to read the determined duration from the mode register is received.

10. The memory device of claim 1, wherein the memory array is a DRAM array.

11. A memory system, comprising:
    a memory controller; and
    a memory device including:
       a memory array including a plurality of rows of memory cells; and
       circuitry configured to:
          determine that a criterion to perform an internal management operation on a subset of the plurality of rows has been met,
          signal to the memory controller that the criterion has been met,
          determine a duration corresponding to the internal management operation, and
          in response to a command received from the memory controller, output the determined duration.

12. The memory system of claim 11, wherein the memory device further includes an external pin operably coupled to the memory controller and wherein the circuitry is configured to signal to the memory controller that the criterion has been met by asserting a voltage to the external pin.

13. The memory system of claim 12, wherein the external pin is a dedicated READY/WAIT pin.

14. The memory system of claim 11, wherein the memory device further includes a mode register, and wherein the command received from the memory controller is a mode register read command.

15. The memory system of claim 11, wherein the criterion includes a first row of the subset accumulating a count of activations exceeding a first threshold.

16. The memory system of claim 15, wherein determining the duration includes determining a number of rows in the subset.

17. The memory system of claim 16, wherein determining the number of rows in the subset includes determining that the rows in the subset have each accumulated a count of activations exceeding a second threshold lower than the first threshold.

18. The memory system of claim 15, wherein count of activations comprise activations directed to rows adjacent to the first row.

19. The memory system of claim 11, wherein the internal management operation includes refreshing the rows of the subset.

20. A method of operating a memory device, comprising:
    determining that a criterion to perform an internal management operation on a subset of a plurality of rows of the memory device has been met,
    in response to determining the criterion has been met, transmitting a signal to an external pin of the memory device,
    determining a duration corresponding to the internal management operation,
    writing a bit value indicative of the determined duration to the mode register.

21. The method of claim 20, further comprising outputting, in response to a mode register read command, the bit value indicative of the determined duration written to the mode register.

* * * * *